(12) United States Patent
Klepser et al.

(10) Patent No.: US 11,975,698 B2
(45) Date of Patent: May 7, 2024

(54) METHOD FOR CONTROLLING AN ELECTRONICALLY SLIP-CONTROLLABLE EXTERNALLY POWERED BRAKE SYSTEM, IN PARTICULAR FOR A MOTOR VEHICLE, AND ELECTRONICALLY SLIP-CONTROLLABLE EXTERNALLY POWERED BRAKE SYSTEM, IN PARTICULAR FOR A MOTOR VEHICLE

(71) Applicant: Robert Bosch GmbH, Stuttgart (DE)

(72) Inventors: Bernd Klepser, Lauffen (DE); Armin Frueh, Bietigheim-Bissingen (DE); Dirk Foerch, Neuenstadt/Stein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 261 days.

(21) Appl. No.: 17/762,196

(22) PCT Filed: Aug. 11, 2020

(86) PCT No.: PCT/EP2020/072512
§ 371 (c)(1),
(2) Date: Mar. 21, 2022

(87) PCT Pub. No.: WO2021/063577
PCT Pub. Date: Apr. 8, 2021

(65) Prior Publication Data
US 2022/0371564 A1    Nov. 24, 2022

(30) Foreign Application Priority Data

Oct. 4, 2019   (DE) ..................... 10 2019 215 288.0

(51) Int. Cl.
*B60T 7/04* (2006.01)
*B60T 7/12* (2006.01)
*B60T 8/175* (2006.01)
*B60T 8/176* (2006.01)
(Continued)

(52) U.S. Cl.
CPC ............ *B60T 13/662* (2013.01); *B60T 7/042* (2013.01); *B60T 7/12* (2013.01); *B60T 8/175* (2013.01);
(Continued)

(58) Field of Classification Search
CPC . B60T 7/042; B60T 7/12; B60T 8/175; B60T 8/176; B60T 8/1761;
(Continued)

(56) References Cited

U.S. PATENT DOCUMENTS

| 2017/0072928 A1 | 3/2017 | Kim et al. |
| 2018/0162339 A1* | 6/2018 | Irwan ........................ B60T 8/00 |

(Continued)

FOREIGN PATENT DOCUMENTS

| DE | 102014205431 A1 | 10/2014 |
| DE | 102015225057 A1 | 6/2017 |

(Continued)

OTHER PUBLICATIONS

International Search Report for PCT/EP2020/072512, dated Oct. 20, 2020.

*Primary Examiner* — Erick R Solis
(74) *Attorney, Agent, or Firm* — NORTON ROSE FULBRIGHT US LLP; Gerard A. Messina

(57) ABSTRACT

A method for controlling a brake system. The brake system includes an actuating device, a master brake cylinder, a brake circuit, a wheel brake, and a brake pressure generator. The brake pressure generator and the master brake cylinder are capable of being contacted, parallel to one another, to the brake circuit. A pressure generator control valve controls a first pressure medium connection between the brake pressure generator and the brake circuit. A brake circuit control valve controls a second pressure medium connection between the brake circuit and the master brake cylinder. The (Continued)

brake system is operated in an operating state during which the pressure generator control valve assumes an open position without a brake pressure prevailing in the brake circuit and without a buildup of brake pressure being carried out. During this operating state, the brake circuit control valve is controlled to assume an open position.

7 Claims, 3 Drawing Sheets

(51) Int. Cl.
*B60T 13/66* (2006.01)
*B60T 13/68* (2006.01)

(52) U.S. Cl.
CPC ............ *B60T 13/68* (2013.01); *B60T 13/686* (2013.01); *B60Y 2400/81* (2013.01)

(58) Field of Classification Search
CPC ............ B60T 8/17613; B60T 8/17616; B60T 13/662; B60T 13/68; B60T 13/686; B60Y 2400/81

USPC ..................................................... 701/70–83
See application file for complete search history.

(56) References Cited

U.S. PATENT DOCUMENTS

| 2018/0162341 A1* | 6/2018 | Irwan ..................... B60T 13/686 |
| 2018/0273008 A1 | 9/2018 | Kim et al. |
| 2022/0258710 A1* | 8/2022 | Weh ....................... B60T 13/745 |
| 2023/0192060 A1* | 6/2023 | Loeffelmann ........... B60T 17/22 188/1.11 R |

FOREIGN PATENT DOCUMENTS

| DE | 102015226568 A1 | 6/2017 |
| DE | 102017221478 A1 | 6/2019 |
| JP | 2006273045 A | 10/2006 |
| WO | 2018046168 A1 | 3/2018 |
| WO | 2019179668 A1 | 9/2019 |

* cited by examiner

METHOD FOR CONTROLLING AN ELECTRONICALLY SLIP-CONTROLLABLE EXTERNALLY POWERED BRAKE SYSTEM, IN PARTICULAR FOR A MOTOR VEHICLE, AND ELECTRONICALLY SLIP-CONTROLLABLE EXTERNALLY POWERED BRAKE SYSTEM, IN PARTICULAR FOR A MOTOR VEHICLE

FIELD

The present invention relates to a method for controlling an electronically slip-controllable externally powered brake system, in particular for a motor vehicle, and to an electronically slip-controllable externally powered brake system controlled according to this method, in particular for a motor vehicle.

BACKGROUND INFORMATION

Electronically slip-controllable externally powered brake systems in motor vehicles are part of the related art. They differ from conventional muscular force brake systems principally in that here the driver is not involved in building up a brake pressure, but rather merely indicates a desired braking which is then set by a brake pressure generator driven by external force. External force brake systems are suitable in particular for use in modern vehicles having electric drive, in which braking torques of a plurality of systems that interact with one another are superposed on one another during a braking. Apart from this, externally powered brake systems are also used in vehicles that are equipped with electronic assistance systems, and that permit at least partly autonomous driving or braking maneuvers, for example in order to automatically regulate the distance from a vehicle traveling in front.

An advantage of decoupling the driver from the buildup of brake pressure is for example that the driver does not receive any haptically perceptible feedback from the brake system itself, for example in the case of changes in pressure due to a wheel slip controlling taking place during anti-blocking control operation (ABS), or when a controlling of the driving dynamics is taking place (ESP mode). In addition, externally powered brake systems improve driver comfort, because changes in pressure no longer produce noises that can be transmitted into the interior compartment of a vehicle via a brake pedal.

An externally powered brake system like the one on which the present invention is based is described in German Patent Application No. DE 10 2014 205 431 A1.

In externally powered brake systems, a distinction is made between a passive and an active operating state. During the passive operating state, there is no desired braking on the part of the driver, and the electronic control device also does not build up any brake pressure in the brake circuits. In contrast, in the active operating state a braking process, or a buildup of brake pressure, takes place through the brake pressure generator, which is operated by external force. For the transition from the passive to the active operating state, there is a change in the electric controlling of the various controllable valve and brake pressure generator components of the externally powered brake system. In the related art, during this transition between the operating states noises occur due to the large number of components to be controlled, which noises are perceptible in the interior of the vehicle by the vehicle occupants, and can correspondingly impair the operating comfort of the vehicle.

SUMMARY

An object of the present invention is to improve the operating noise of the externally powered brake system, and to increase driving comfort of the vehicle during a transition between the operating states of an externally powered brake system.

According to the present invention, this may be achieved, inter alia, in that during an operating state of the externally powered brake system in which no brake pressure buildup is taking place in the brake circuit, the brake circuit control valve is controlled by the electronic control device in such a way that it assumes an open position.

Further advantages or advantageous developments of the present invention result from the disclosure herein.

BRIEF DESCRIPTION OF THE DRAWINGS

An exemplary embodiment of the present invention is shown in the figures and is explained in detail in the following description.

DETAILED DESCRIPTION OF EXAMPLE EMBODIMENTS

Figure 1:
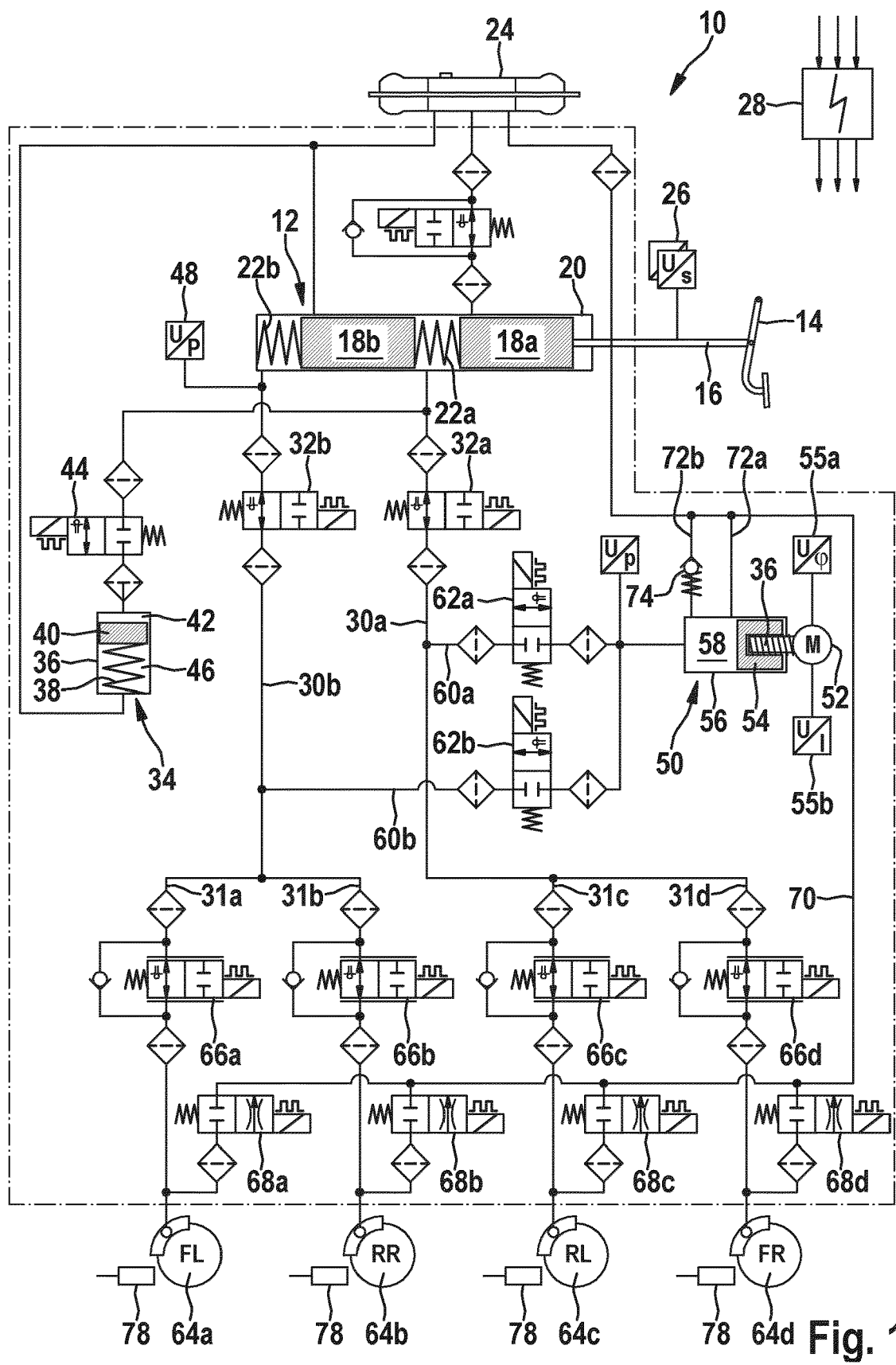
FIG. 1 shows the hydraulic circuit diagram of an externally powered brake system during a passive operating state.

FIG. 1 shows the externally powered brake system during the passive operating state. The externally powered brake system assumes this operating state when there is no desired braking, or when no buildup of brake pressure is being carried out by an electronic control device.

The conventional externally powered brake system 10 is equipped with a master brake cylinder 12 that can be actuated by the driver via an actuating element 14 in order to specify a desired braking. In FIG. 1, a brake pedal is shown as actuating element 14; alternatively, however, for example a brake lever is possible. In the exemplary embodiment, actuating element 14 is connected via a pressure rod 16 to one of a total of (as an example) two master brake cylinder pistons 18a,b. In a common cylinder housing 20, master brake cylinder pistons 18a,b each adjoin an associated pressure chamber 22a,b that is supplied with hydraulic pressure medium from a pressure medium reservoir 24 coupled to master brake cylinder 12. Pressure chamber 22a facing actuating element 14 is situated between the two master brake cylinder pistons 18a,b, and accommodates a first piston spring via which first master brake cylinder piston 18a is supported on second master brake cylinder piston 18b. Via a second piston spring, second master brake cylinder piston 18b is supported on the floor of cylinder housing 20. Thus, with an actuation of actuating element 14 by the driver, the two master brake cylinder pistons 18a,b move forward, in the direction of pressure buildup, and thus move into the interior of cylinder housing 20. Here, the volume of the associated pressure chambers 22a,b decreases, and actuating element 14 travels an actuating path. This path is acquired by a path sensor 26 and is converted into a voltage signal. This voltage signal behaves proportionally to the desired braking, and forms an essential input variable for brake pressure controlling by an electronic control device 28 that is assigned to externally powered brake system 10.

One of a total of two brake circuits 30a,b of externally powered brake system 10 is respectively controllably connected to each of the two pressure chambers 22a,b of master brake cylinder 12. For the controlling, a so-called circular separating valve 32a,b is respectively provided in each brake circuit 30a,b. These circular separating valves 32a,b are each a normally open 2/2-way switching valve that can be brought from the open position to a blocking position through electrical controlling by electronic control unit 28 of externally powered brake system 10.

In the depicted passive operating state of externally powered brake system 10, circular separating valves 32a,b assume their open positions, thus producing a hydraulic connection of master brake cylinder 12 to brake circuits 30a,b.

In order to enable an actuating path of actuating element 14 of externally powered brake system 10 even in the case of closed circular separating valves 32a,b, i.e. during the active operating state of externally powered brake system 10 (FIG. 2), pressure chamber 22a, facing actuating element 14, of master brake cylinder 12 is connected to a pedal path simulator 34. This pedal path simulator 34 is a simulator piston 40, accommodated in a simulator cylinder 36 and loaded by a spring-elastic element 38, which simulator piston limits a simulator chamber 42 that is fillable with the pressure medium from pressure chamber 22a of master brake cylinder 12. Spring-elastic element 38 acts opposite to the inflow direction of the pressure medium into simulator chamber 42, and is situated on a rear side of simulator piston 40 for this purpose. The hydraulic connection of pedal path simulator 34 to pressure chamber 22a of master brake cylinder 12 is here again made controllable. For this purpose, a simulator control valve 44 is provided that is realized as an electrically controllable, normally closed 2/2-way switching valve.

In the depicted passive operating state of externally powered brake system 10, simulator control valve 44 correspondingly assumes its blocking position, so that no pressure medium can flow from pressure chamber 22a of the actuated master brake cylinder 12 into simulator chamber 42.

Spring-elastic element 38 of pedal path simulator 34 is, as mentioned, situated in a rear chamber 46 on a rear side, facing away from simulator chamber 42, of simulator piston 40, inside simulator cylinder 36. This rear chamber 46 is also filled with hydraulic pressure medium, and for this purpose is in hydraulic connection both with the second pressure chamber 22b, remote from actuating element 14, of master brake cylinder 12, and also, parallel thereto, with pressure medium reservoir 24 of externally powered brake system 10. In order to acquire the pressure in second pressure chamber 22b of master brake cylinder 12, externally powered brake system 10 is equipped with a pressure sensor 48. This sensor provides a voltage signal to electronic control device 28, which signal corresponds to the brake pressure prevailing in the associated brake circuit 30b. The pressure signal and the path signal of path sensor 26 form variables that are redundant to one another for controlling the brake pressure in brake circuits 30a,b.

Downstream from circular separating valves 32a,b, a motor-driven brake pressure generator 50 is contacted with brake circuits 30a,b, parallel to master brake cylinder 12. This brake pressure generator 50 is a plunger device having a plunger piston 54 actuatable by a drive motor 52, which piston is held in axially movable fashion in a plunger cylinder 56. The driven plunger piston 54 displaces pressure medium from a plunger working chamber 58 into brake circuits 30a,b, when it is driven in the direction of pressure buildup, or, when plunger piston 54 is driven in the opposite direction, i.e. the direction of pressure dismantling, removes pressure medium from brake circuits 30a,b. In the direction of pressure buildup, the volume of plunger working chamber 58 continuously decreases, and in the direction of pressure dismantling it correspondingly increases.

The actuation of drive motor 52 is monitored by a motor sensor system. Its sensors 55a,b produce a voltage signal proportional to the angle of rotation of a driveshaft of drive motor 52, as well as a voltage signal proportional to the motor current. Both voltage signals are also acquired by electronic control device 28, and are evaluated for, inter alia, the regulation of the brake pressure.

Hydraulic line connections 60a,b of brake pressure generator 50 to brake circuits 30a,b are controllable by plunger control valves 62a,b. These plunger control valves 62a,b are 2/2-way switching valves that are closed in their basic position, and that are switched to an open position by electronic control device 28 in the active operating state of externally powered brake system 10.

In the depicted, passive operating state, plunger control valves 62a,b interrupt line connections 60a,b to brake circuits 30a,b. A buildup of brake pressure in brake circuits 30a,b thus cannot be carried out by brake pressure generator 50.

Downstream from the location at which brake pressure generator 50 is coupled to brake circuits 30a,b, these brake circuits 30a,b each branch into two brake circuit branches 31a-d. Each of these brake circuit branches 31a-d supplies, for example, a respective connected wheel brake 64a-d with pressure medium under brake pressure, as needed. Wheel brakes 64a-d are for example configured in a diagonal distribution on the vehicle, i.e., one of the wheel brakes 64a,d of the front axle (FL and FR) and one of the wheel brakes 64b,c of the rear axle (RR, RL) of a vehicle are respectively situated in one of the brake circuits 30a, 30b. The two wheel brakes 64a and 64d, or 64b and 64c, of an axle are in addition situated on different sides of the vehicle.

A brake pressure control valve device is connected before each wheel brake 64a-d. This device includes a pressure buildup valve 66a-d that is electrically controllable by electronic control device 28, and a similar pressure dismantling valve 68a-d. Pressure buildup valves 66a-d are each realized as normally open 2/2-way proportional valves, while pressure dismantling valves 68a-d are each fashioned as normally blocking 2/2-way switching valves.

In the depicted passive operating state of externally powered brake system 10, pressure buildup valves 66a-d and pressure reduction valves 68a-d each assume their explained basic positions.

From pressure dismantling valves 68a-d, a common pressure medium return line 70 leads back to pressure medium reservoir 24. This pressure medium return line 70 is contacted to brake pressure generator 50 via two pressure medium branches 72a,b. A first pressure medium branch 72an opens into plunger working chamber 58 in the region of an inner dead center point relative to the position of plunger piston 54 inside plunger cylinder 56, and a second pressure medium branch 72b is situated in the region of the outer dead center point of plunger piston 54. Second pressure medium branch 72b is controlled by a check valve 74 that blocks a flow of pressure medium from plunger working chamber 58 to pressure medium reservoir 24 when plunger piston 54 is actuated by drive motor 52 in the direction of pressure buildup. Pressure medium branch 72a is controlled as a function of the position of plunger piston 54 in plunger cylinder 56.

During the passive operating state of externally powered brake system 10, plunger piston 54 assumes a position in which first pressure medium branch 72a, leading to pressure medium return line 70 or to pressure medium reservoir 24, is open, as shown.

In the passive operating state of externally powered brake system 10, wheel brakes 64a-d of brake circuits 30a,b are hydraulically connected to the non-actuated master brake cylinder 12 via the open pressure buildup valves 66a-d, and in addition via the likewise open circular separating valves 32a,b, and are therefore pressureless.

Figure 2:
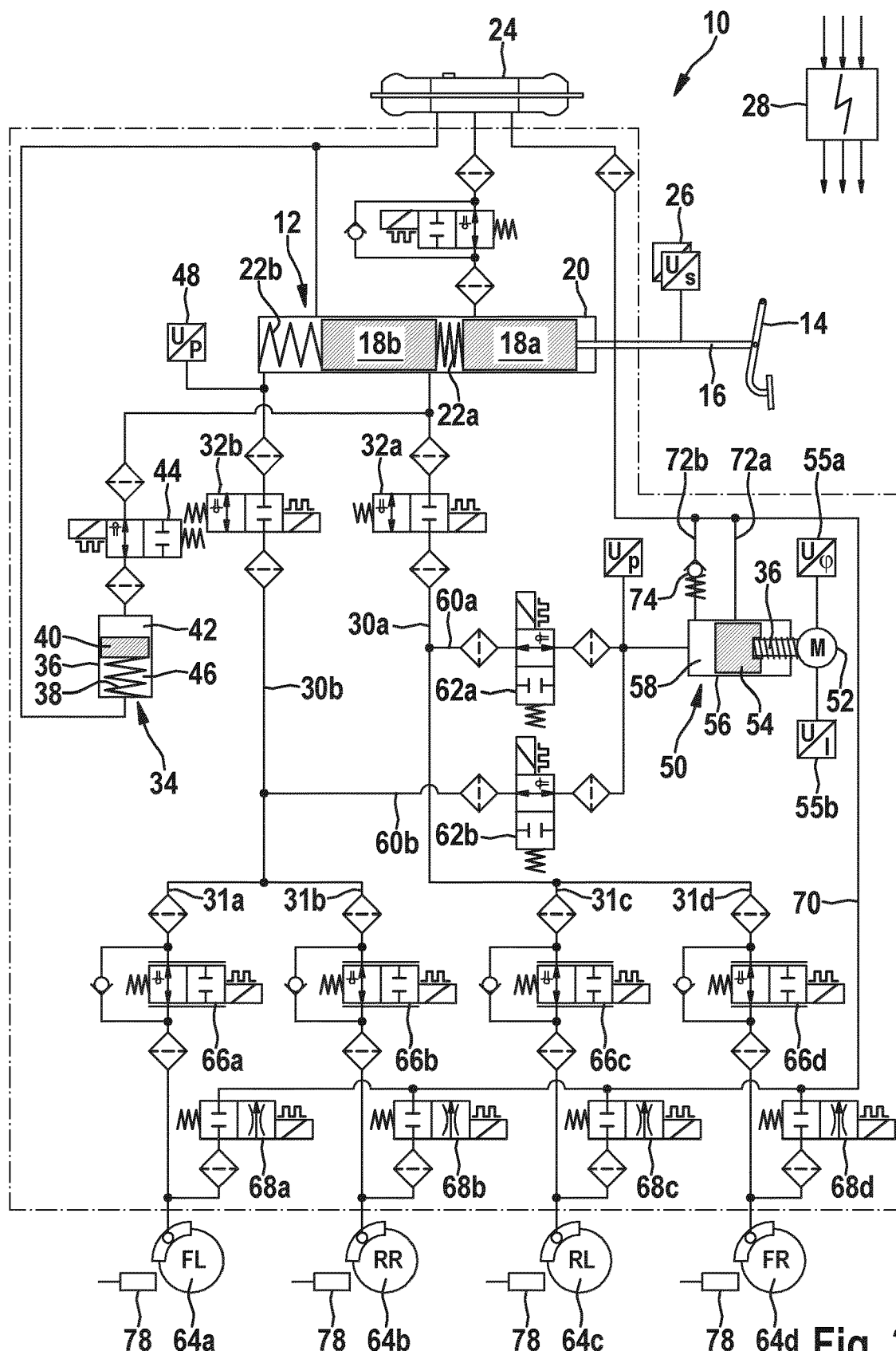
FIG. 2 shows, in contrast, the hydraulic circuit diagram of the externally powered brake system during the active operating state.

FIG. 2 illustrates externally powered brake system 10 according to FIG. 1 during an active operating state, the already-mentioned valve and pressure generator components here being provided with corresponding reference characters for simplicity, although they assume valve positions here that differ from those in FIG. 1. The transition to this active operating state takes place as soon as there is a desired braking, or as soon a brake pressure is built up in brake circuits 30a,b by electronic control device 28 through the electrical controlling of drive motor 52 of pressure generator 50.

In principle, externally powered brake system 10 operates as follows: when a buildup of brake pressure takes place in response to a desired braking by the driver, for this purpose the driver actuates actuating element 14 of externally powered brake system 10. As a result, master brake cylinder piston 18a, mechanically coupled to this actuating element 14 via pressure rod 16, displaces pressure medium from its associated pressure chamber 22a into simulator chamber 42 of pedal path simulator 34, and actuating element 14 executes a corresponding actuation path. This path is acquired by path sensor 26 and is converted into a voltage signal that is supplied to electronic control device 28. This device infers a desired braking from the voltage signal, and generates a control signal for drive motor 52 of brake pressure generator 50. Drive motor 52 drives plunger piston 54 in the direction of pressure buildup. Pressure medium is then displaced from plunger working chamber 58 in the direction of wheel brakes 64a-d, where it causes a buildup of brake pressure proportional to the actuation of actuating element 14. As a result, the vehicle executes a braking.

If the brake pressure at at least one of the wheel brakes 64a-d of the vehicle is so high that it threatens to lock the wheel associated with this wheel brake 64a-d, then this risk of locking is recognized by wheel rotational speed sensors 78 and is communicated to electronic control device 28. This control device thereupon controls the brake pressure valve control device in such a way that the relevant pressure buildup valve 66a-d assumes the blocking position, and pressure reduction valve 68a-d assumes the open position. The brake pressure is dismantled in wheel-individual fashion via the pressure medium return line 70 to pressure medium reservoir 24 until the associated wheel again has a rotational speed corresponding to the vehicle speed. The brake pressure valve control device is then put back into its explained initial state by electronic control device 28.

When there is a transition to the active operating state, the two circular separating valves 32a,b are first controlled by electronic control device 28 and are put into the blocking positions illustrated in FIG. 2. Master brake cylinder 12 is thereby decoupled from brake circuits 30a,b, and consequently continues to act as a device for detecting a desired braking.

Plunger control valves 62a,b also continue to be electrically controlled and switched into their open position, as shown in FIG. 2. This produces a hydraulic connection of brake pressure generator 50 to brake circuits 30a,b, so that a corresponding buildup of brake pressure can be carried out through an actuation of drive motor 52 by brake pressure generator 50. So that this brake pressure buildup will take place without a time delay, and therefore with a high pressure buildup dynamic, plunger piston 54 is moved into a position in which the first pressure medium branch 72a of plunger working chamber 58, formed at the inner dead center point of the position of plunger piston 54, to pressure medium reservoir 24 is interrupted by plunger piston 54. For this purpose, plunger piston 54 is moved some distance forward, starting from its inner dead point position, in the pressure buildup direction through electrical controlling of drive motor 52.

Finally, when there is a transition to the active operating state, simulator control valve 44 is still controlled and is put into its open position. Pressure chamber 22a of master brake cylinder 12 at the pedal is thus coupled to pedal path simulator 34, as is illustrated in FIG. 2 by a displaced plunger piston 40.

The explained electrical controlling of the mentioned components when there is a transition of externally powered brake system 10 from the passive operating state to the active operating state disadvantageously causes operational noises. These noises are perceptible inside the vehicle by the occupants, and may impair driving comfort.

Figure 3:
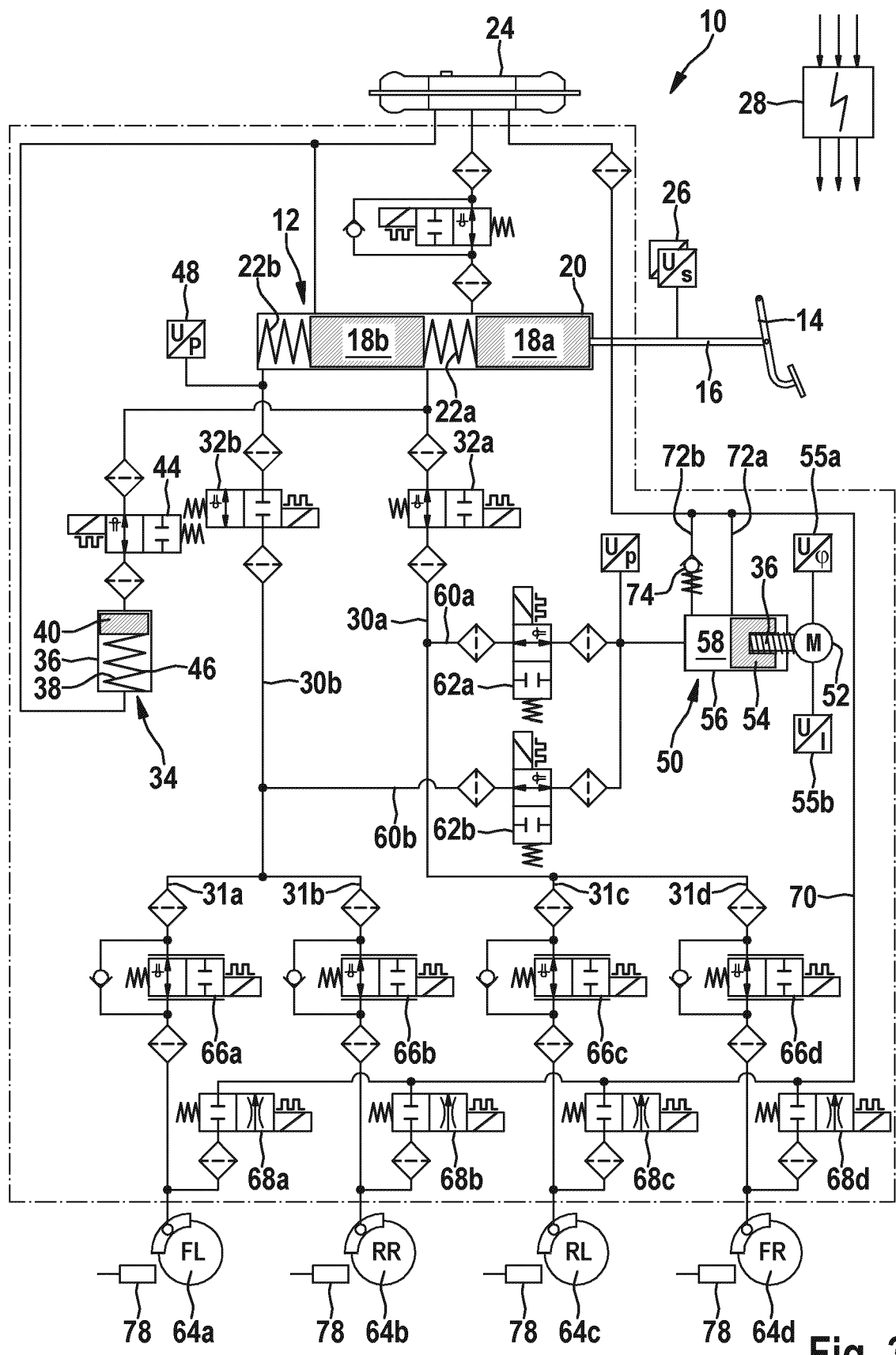
FIG. 3 illustrates an example embodiment of the present invention on the basis of a hydraulic circuit diagram in which the externally powered brake system is in an operating state that, in order to distinguish it from the operating states explained above, is designated an active operating state without generation of brake pressure.

In FIG. 3, an example embodiment of the present invention is illustrated, and relates to, inter alia, a method for controlling externally powered brake system 10. The example method of the present invention aims to ameliorate the operating noise, and to increase the comfort of this externally powered brake system 10 by setting modified switching positions of the valves and pressure-generating components when externally powered brake system 10 is in an operating state in which no brake pressure buildup takes place. To distinguish it from the operating states explained above, this operating state is designated an active operating state without brake pressure buildup.

According to the present invention, it is provided that during this operating state of externally powered brake system 10, plunger piston 54 maintains its current position inside plunger cylinder 56, and consequently blocks the first pressure medium connection 72a to pressure medium return line 70. In addition, at least one of the two circular separating valves 32a,b is electrically controlled in such a way that it assumes its open position. Finally, via this at least one open circular separating valve 32a,b, the two brake circuits 30a,b are hydraulically connected to one of the pressure chambers 22a,b of master brake cylinder 12 and thus to pressure medium reservoir 24. This hydraulic connection to pressure medium reservoir 24 takes place in brake circuits 30a immediately, via the associated circular separating valve 32a, while in the respectively other brake circuit 30b this connection is made only indirectly, via the plunger control valves 62a,b, which are electrically actuated and thus assume their open position, the intermediately connected plunger working chamber 58 of brake pressure generator 50, and circular separating valve 32a in the open position.

Here it is to be noted that alternatively, instead of the one circular separating valve 32a, the respective other circular separating valve 32b can also be put into the open position, or also that both circular separating valves 32a,b can assume their open positions.

A heating of the pressure medium that may occur, and a resulting increase in the volume of the pressure medium in brake circuits 30a,b during the active operating state without brake pressure buildup, is accordingly capable of being dismantled towards brake medium reservoir 24, and a brake pressure buildup in wheel brakes 64a-d, or an occurrence of a residual grinding torque in wheel brakes 64a-d, is accordingly counteracted, without requiring for this purpose an actuation of plunger piston 54 in the pressure-dismantling direction.

Through an adapted electrical controlling of drive motor 52 of brake pressure generator 50, the position of plunger piston 54 inside plunger cylinder 56 is maintained during this operating state of externally powered brake system 10.

Thus, for a transition from this active operating state without brake pressure buildup to the active operating state with brake pressure buildup, all that is required is a cessation of the electrical controlling of the circular separating valve or valves 32a,b. The electrical controlling of plunger control valves 62a,b does not change, and plunger piston 54 also maintains its position inside plunger cylinder 56. First pressure medium connection 72a of plunger working chamber 58 to pressure medium return line 70 thus remains closed.

Finally, according to the present invention there accordingly take place fewer actuations of the involved components in the transition between the operating states, and consequently fewer operating noises are caused thereby. As a result, the noise comfort of the vehicle is improved with unchanged functionality of externally powered brake system 10.

Of course, modifications or additions to the described exemplary embodiment are possible without departing from the basic idea of the present invention.

What is claimed is:

1. A method for controlling an electronically slip-controllable externally powered brake system for a motor vehicle, the externally powered brake system including an actuating device configured to specify a desired braking; a master brake cylinder coupled to the actuating device; at least one brake circuit; a wheel brake connected to the brake circuit; a brake pressure generator actuatable by external force, the brake pressure generator and the master brake cylinder each being contacted, parallel to one another, to the brake circuit; a pressure generator control valve configured to control a first pressure medium connection between the brake pressure generator and the brake circuit; and a brake circuit control valve configured to control a second pressure medium connection between the brake circuit and the master brake cylinder, the method comprising the following:

operating the externally powered brake system in an operating state during which the pressure generator control valve assumes an open position without a brake pressure prevailing in the brake circuit and without a buildup of brake pressure being carried out, and in the operating state of the externally powered brake system, the brake circuit control valve is actuated in such a way that the brake control valve assumes an open position.

2. The method as recited in claim 1, wherein during the operating state of the externally powered brake system, an existing third pressure medium connection of the brake pressure generator to a pressure medium reservoir of the externally powered brake system is interrupted.

3. The method as recited in claim 2, wherein the brake pressure generator of the externally powered brake system has a plunger piston that is drivable by an electric motor and is guided in axially movable fashion in a plunger cylinder, and the third pressure medium connection of the brake pressure generator to the brake medium reservoir is interrupted by a corresponding positioning of the plunger piston in the plunger cylinder.

4. The method as recited in claim 1, wherein the externally powered brake system is equipped with a first brake circuit and a second brake circuit, and a first brake circuit control valve that is assigned to the first brake circuit and a second brake circuit control valve that is assigned to the second brake circuit, and wherein during the operating state of the externally powered brake system, at least one of the first and second brake circuit control valves is controlled.

5. The method as recited in claim 1, wherein the externally powered brake system is equipped with a path simulator that enables an actuation path of the actuating device, and the path simulator is contacted in controllable fashion to the master brake cylinder via an actuatable simulator control valve, and wherein the simulator control valve is actuated during the operating state of the externally powered brake system in such a way that the simulator control valve assumes an open position.

6. The method as recited in claim 5, wherein the externally powered brake system is equipped with an electronic control device, and the actuation of the brake circuit control valve, and/or of the plunger piston, and/or of the simulator control valve, is controlled by the electronic control device.

7. An electronically slip-controllable externally powered brake system for a motor vehicle, comprising:
an actuating device configured to specify a desired braking;
a master brake cylinder coupled to the actuating device;
at least one brake circuit;
a wheel brake connected to the brake circuit;
a brake pressure generator actuatable by external force, the brake pressure generator and the master brake cylinder each being contacted, in controllable fashion and parallel to one another, to the brake circuit;
a pressure generator control valve configured to control a first pressure medium connection between the brake pressure generator and the brake circuit; and
a brake circuit control valve configured to control a second pressure medium connection between the brake circuit and the master brake cylinder;
wherein the externally powered brake system is configured to be operated in an operating state during which the pressure generator control valve assumes an open position without a brake pressure prevailing in the brake circuit and without a buildup of brake pressure being carried out, and in the operating state of the externally powered brake system, the brake circuit control valve is actuated in such a way that the brake control valve assumes an open position.

* * * * *